Nov. 22, 1955

F. F. KOLBE 2,724,492

ENDLESS BELT ALIGNER

Filed Oct. 30, 1952

INVENTOR.
Frank F. Kolbe
BY
Brown, Jackson, Boettcher & Dienner
Attys:

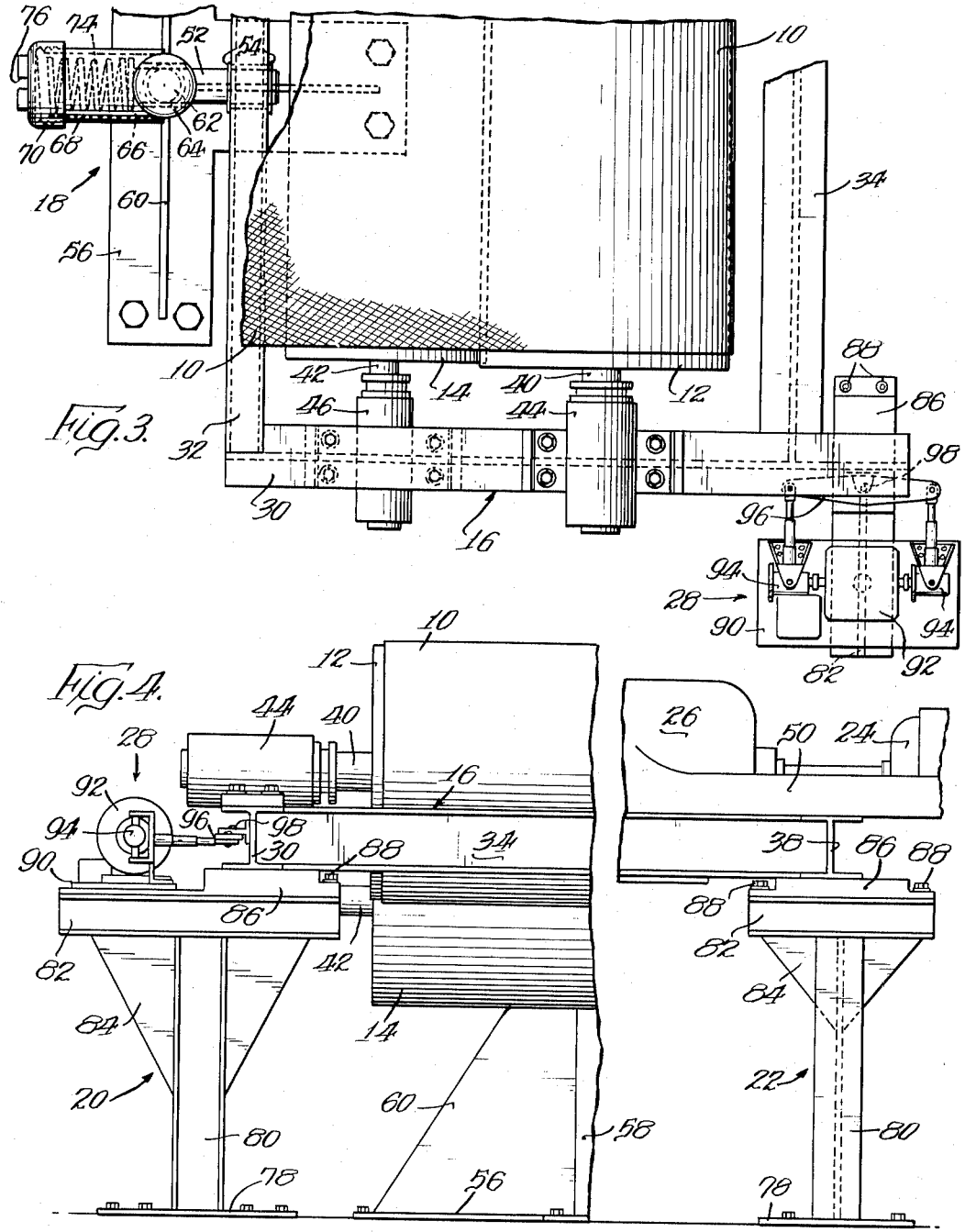

United States Patent Office 2,724,492
Patented Nov. 22, 1955

2,724,492

ENDLESS BELT ALIGNER

Frank F. Kolbe, Chicago, Ill., assignor to The United Electric Coal Companies, Chicago, Ill., a corporation of Delaware Application October 30, 1952, Serial No. 317,808

11 Claims. (Cl. 198—202)

The present invention relates to improved apparatus for automatically aligning and maintaining the alignment of conveyor belts and the like on their supporting rollers and/or pulleys.

I am aware that many developments of the character briefly referred to have previously been made in the art. These developments may be said, generally, to fall into three categories or types. The principal type of apparatus involves the supporting of a pulley or roller at one side in a bearing that is capable of pivotal movement and at the other side in a bearing provided with means for moving the same so as to tilt the roller with respect to the conveyor belt or web. This type of apparatus suffers the very serious defect, among others, that a large power unit is required to actuate the movable bearing against the load of and the load on the conveyor belt or the like. Also, accurate guides must be provided for the movable bearing, and the pivotal bearing must be of extremely sturdy and accurate construction, as must the other components of the structure.

The second type of apparatus involves the supporting of one of the pulleys or rollers for the belt or web in a yoke and pivotally mounting the yoke centrally beneath the roller to accommodate movement of the roller about the pivotal support of the yoke so as to dispose the roller at an inclination with respect to the longitudinal axis of the belt. As will be appreciated, this is not substantially different from the principal type of apparatus referred to hereinbefore, but is a modification thereof, and suffers the same disadvantages, particularly as regards the power unit size.

The third type of apparatus utilizes a pulley or roller that is capable of reciprocation along its own axis to effect alignment of the belt. First of all, this type of apparatus is not satisfactory for the reason that there is no alignment of the belt on the roller, but merely misalignment of one roller with respect to the remainder of the apparatus. Again, a large power unit must be provided and the various components of the apparatus must be of sturdy and accurate construction.

It is an object of the present invention to provide an improved belt aligner of economical manufacture and assembly that does not require a high degree of accuracy in its manufacture, that is extremely sturdy and efficient in use, and that requires only a very small power unit.

Another object of the invention is to provide an improved belt aligner including a movable frame upon which one or more belt pulleys are mounted and wherein only a small motive force is required to move the frame to maintain proper belt alignment.

In accordance with the present invention, I provide an improved belt aligner including a frame upon which a belt pulley is mounted, means pivotally supporting the frame at one end thereof, means slidably supporting the frame at the other end thereof, and a small power unit adjacent the said other end of the frame for swinging the same about its pivotal support, whereby the pulley axis is tilted or otherwise swung with respect to the longitudinal axis of the belt to effect alignment of the belt on the pulley.

A further object of the invention is the provision of an improved belt aligner including a frame upon which an end pulley and a snub pulley are mounted, and a pivotal axis for the frame disposed in spaced relation and at right angles to the axis of the pulleys, whereby pivotal movement of the frame will effect movement of the end pulley transversely and longitudinally of the belt to provide an improved and rapid aligning function.

A still further object of the invention is the provision of an improved belt aligner constructed as set forth above wherein the belt drive pulley and the drive means therefor are mounted on and are movable with the frame.

In addition to the foregoing, previous proposals in the art have not been capable of adaptation to metallic conveyor belts due to various factors, including the material of the belts, the weight of the belts, the increased loads carried by the belts and the large size power unit that would be required for such installation. In this respect, it is also an object of the present invention to provide improved aligning apparatus particularly adapted for metallic conveyor belts.

Other objects and advantages of the present invention will become apparent in the following detailed description of a preferred embodiment of the invention, wherein reference is made to the accompanying drawings, in which:

Figure 3 is a fragmentary plan view of the aligner; and

Figure 4 is a fragmentary rear elevation of the belt aligner.

Figure 1:
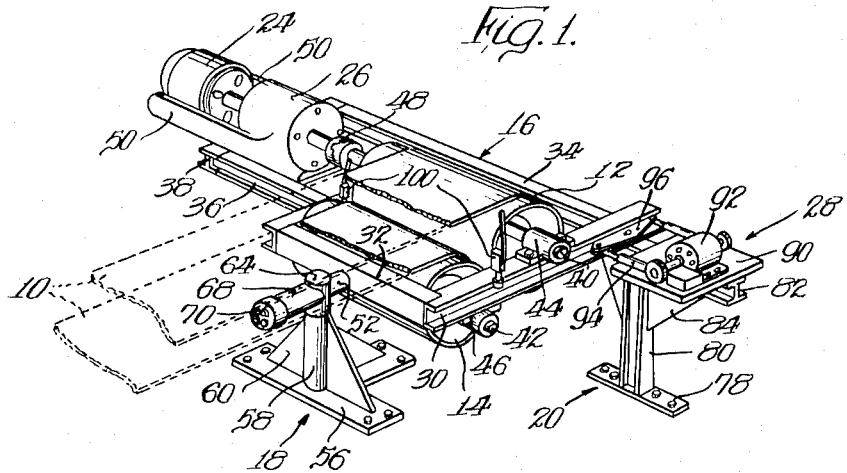
Figure 1 is a perspective view of the improved belt aligner of the present invention.

Referring now to Figure 1, a conveyor belt 10 is shown as reeved over a drive end pulley 12 and maintained taut by means of a snub pulley 14, which pulleys are journaled in spaced parallel relation on a frame 16. The frame 16 is supported by three legs 18, 20 and 22 (see Figure 4) and carries an electric drive motor 24 and a speed reducer 26. To move the frame, an actuator 28, to be described fully hereinafter, is provided.

The frame 16 includes a generally rectangular main portion consisting of a pair of side beams 30 and a forward end or cross beam 32. At the rearward end of the side beams 30, an elongate cross beam 34 is provided extending between the side beams 30 parallel to the forward end beam 32 and extending to one side of the main portion of the frame. A laterally extending beam 36 projects from the side of one of the side beams 30 in spaced parallel relation to the extending portion of the rear cross beam 34, which with the beam 34 and an end beam 38 provides a lateral frame portion. The various frame members are preferably conventional structural steel forms, such as box, H beam, I beam, channel and like forms. The shafts 40 and 42, respectively, of the pulleys 12 and 14 are each journaled at the ends thereof in a pair of bearings 44 and 46, respectively, mounted on the opposite side beams 30. The lateral frame comprising the beams 34, 36 and 38 is aligned, generally, with the shaft 40 of the pulley 12 and adjacent the outer end thereof supports the speed reducer 26. The speed reducer 26 is connected by means of a coupling 48 to the shaft 40 of the drive pulley 12 and the frame of the reducer includes a pair of extensions 50 on which the motor 24 is supported with the shaft thereof coupled to the shaft of the reducer.

Figure 2:
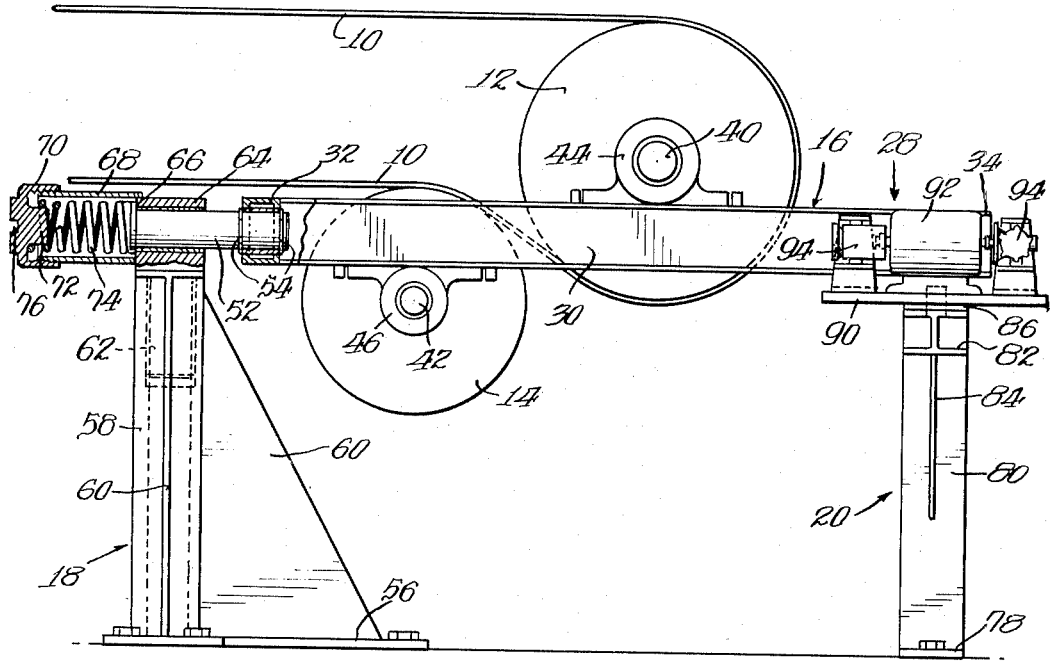
Figure 2 is a side view, on an enlarged scale, partly in section and partly in elevation, of the belt aligner.

As shown in Figure 2, the pulleys 12 and 14 are disposed in spaced parallel, vertically and horizontally staggered relation with the snub pulley 14 being disposed forwardly of the drive pulley 12. At the forward end of the frame, forwardly of the snub pulley 14, a stud 52 is mounted centrally on the forward cross beam 32 and extends forwardly therefrom in horizontal alignment with the frame, that is, with the side beams 30. The stud 52 may be fixed to the cross beam 32 in any suitable manner, but preferably, the stud is passed freely through apertures provided in the beam 32 and is connected thereto by means of a pair of split rings 54 engaging in circumferential grooves in the stud 52 to the opposite sides of the cross beam 32.

The forward leg 18, which is preferably disposed centrally and forwardly of the main portion of the frame 16 and of the pulleys 12 and 14, is adapted to provide a pivotal support for the forward portion of the frame. To this end, the leg 18 includes a base 56 adapted to be bolted or otherwise secured to a deck and a vertical tubular post 58 supported by the base and braced in all directions on the base by means of triangular brace plates 60. Within the open upper end of the vertical tubular post 58, a shaft 62 is journaled, which shaft provides a vertical pivot axis for a bearing 64 secured thereto and adapted for the slidable passage therethrough of the stud 52. To the side of the bearing 64 opposite the frame 16, the stud 52 is provided with a radially outwardly extending flange 66, which may suitably comprise a split ring fitted in a circumferential groove in the stud. To the same side of the bearing 64, a tubular housing 68 is secured to the bearing 64 for enclosing the free end portion of the stud 52. The free open end of the housing 68 is closed by means of a cap member 70 suitably screw threaded thereto. The cap member 70 includes an axial stud portion 72 projecting into the interior of the housing 68. A compression spring 74, which is positioned over and guided by the stud 72 and the free end of the stud 52, is confined between the end cap 70 and the flange 66 within the housing 68 normally to bias the flange 66 into engagement with the bearing 64 and to maintain proper alignment of the frame 16 with respect to the legs or feet 18, 20 and 22. The compression spring 74 is preferably capable of calibration by means of the cap member 70 which is adjustable on the housing 68, the cap member 70 being provided with a suitable kerf 76 for this purpose.

Referring to Figure 4, the rearward end of the frame 16 is supported for movement about the pivotal axis defined by the shaft 62 by means of the legs 20 and 22, each of which comprises a pedestal having a base 78 adapted to be bolted or otherwise secured to a supporting deck or the like, a vertical post 80 secured to the base 78, a top beam 82 supported on the post 80, brace members 84 for bracing the top beam 82 with respect to the post 80, and a bearing plate 86, preferably formed of brass or the like, suitably secured to the top beam 82 by means of bolts 88 or the like. The legs 20 and 22 are so disposed that the rearward portions of the frame, and preferably the rear cross beam 34, rest on the bearing plates 86 for sliding movement thereon with respect to the legs 20 and 22. The leg 22 to the drive motor side of the frame merely supports that side of the frame for sliding movement with respect thereto, but the leg 20 disposed to the other side of the frame also serves to support the actuator 28. To this end, the bearing plate 86 of the leg 20 includes a raised portion on which the rear cross beam 34 of the frame 16 rides and a reduced end plate portion to which a base plate 90 for the actuator is secured.

The actuator 28 includes a reversible electric motor 92, a pair of linear actuators 94 and a cross link 96 to the opposite ends of which the shafts of the actuators 94 are pivotally connected. The cross link 96 is pivotally connected intermediate its ends to a link 98 secured to the side beam 30 of the frame 16 adjacent the rearward end thereof. As is clearly shown, the actuator 28 is disposed to one side of the frame so as to be capable of effecting swinging movement of the frame about the pivot axis provided by the leg 18. The actuators 94 are conventional linear actuators each including the shafts mentioned hereinbefore, which shafts are simultaneously advanced or retracted upon energization of the motor 92. The linkage means consisting of the actuator shafts, the cross link 96 and the link 98 accommodates movement of the frame 16 and link 98 with respect to the actuator and the pedestal or leg 20.

To control energization of the actuator motor 92 and operation of the actuator, web or belt feelers 100, shown in Figure 1, are disposed on opposite sides of the belt in a position to be engaged by the edges of the belt when the belt moves out of alignment with respect to the drive pulley 12 and the snub pulley 14. As shown, the feelers are preferably mounted on the side beams 30 of the frame 16 and include a contact arm extending adjacent the upper run of the conveyor belt 10. The feelers 100 may be of any desired known construction, such as limit switches or the like, with the motor 92 included in a suitable circuit for effecting actuation of the motor 92 in the proper direction whenever one of the feelers is engaged by the conveyor belt. As has been pointed out hereinbefore, the belt aligner of the present invention is particularly adapted for use with metallic conveyor belts. When utilized with a metallic conveyor belt, the feelers 100 may suitably comprise metallic contacts adapted to close a circuit to the motor 92 through the material of the belt itself.

In use of the belt aligner of the present invention, the apparatus shown and described herein is disposed with the main portion of the frame 16 in longitudinal alignment with a frame or ladder upon which the various guide and supporting rollers and the opposite end pulley for the conveyor belt are mounted. The supporting legs 18, 20 and 22 of the belt aligner may be suitably secured to the deck of the supporting frame or ladder to provide the alignment described. The conveyor belt is then mounted on the various rollers and reeved over the end pulleys in a conventional manner. The reeving of the belt over the drive pulley 12 and the snub pulley 14 is clearly shown in the drawings. When the belt aligner has been associated with the conveyor belt in the manner described, the motor 24 may be set in operation to effect rotation of the drive pulley 12 through the speed reducer 26. Upon rotation of the drive pulley 12, the belt 10 will be driven in the desired direction, as will be apparent. While the belt is running true on the drive pulley 12 and the snub pulley 14, and thus upon the other rollers and pulleys of the assembly, no adjustments will be made. However, should the conveyor belt 10 move to one side or the other, the edge thereof will engage one of the feelers 100 to close the circuit to the motor 92 of the actuator, to energize the motor for rotation in the proper direction to advance or retract the shafts of the actuators 94 and, thus, to swing the frame 16 about the pivot axis provided by the leg 18, at which time the rearward portions of the frame 16 will slide upon the legs 20 and 22.

In pivoting the frame 16 about the leg 18, the pulleys 12 and 14 will be swung in an arc representing movement both longitudinally and laterally of the belt. Thus, the belt will be induced to move to an aligned position on the pulleys by two factors, first, the inclination of the pulley and the tendency of the belt to seek a lower point on the pulley, that is, a point on the pulley where the distance between the end pulleys is less and, second, the lateral impetus imparted to the belt by the side-wise movement of the pulleys. After the necessary adjustment has been made and the belt is moved to an aligned position on the pulleys, as will be sensed by the feelers 100, the feeler switch previously closed will be opened. Preferably, the control circuits within which the feelers 100 and the motor 92 are included, includes automatic control apparatus for returning the actuators 94 and the frame 16 to the normal aligned position of the frame 16 with respect to the ladder or frame supporting the remainder of the conveyor belt.

As an alternative, the feelers 100 may constantly engage the belt edges and be adapted for the actuation of rheostats or the like so as to provide a substantially constant adjusting energization of the actuator motor 92. From the foregoing, it will be appreciated that the actuator 28 will swing the frame about its pivotal axis so as to maintain the conveyor belt in proper alignment on the pulleys 12 and 14 and on the remainder of the supporting rollers and pulleys and with respect to the supporting frame therefor.

The spring 74 associated with the pivotal mounting of the frame accommodates cushioning of blows imparted to the conveyor belt and is adapted to yield to accommodate movement of the frame forwardly when the load on the drive pulley 12 is too great. In other words, when the frame 16 is swung about its pivotal axis by the actuator 28, one side of the pulley 12 will move rearwardly and when the conveyor belt 10 will not accommodate such rearward movement, the spring 74 will yield to accommodate movement of the frame 16 forwardly to a slight extent so as to accommodate the swinging movement of the frame 16.

In the preferred use of my invention, the pivot axis provided by the leg 18 and the shaft 62 is disposed in alignment with the longitudinal axis of the belt and perpendicular to the plane of the belt. However, this relationship need not necessarily be adhered to. Generally, it may be stated that the pivotal axis of the frame should be in spaced substantially perpendicular relationship with respect to the axis of the drive pulley 12.

As will be apparent from the foregoing, the apparatus of my present invention is particularly adapted for strenuous service and heavy loading. Even so, the actuator motor 92 is relatively small for all installations. For example, in an installation wherein a metallic conveyor belt is utilized and the load on the belt is of the order of 15,000 to 20,000 pounds, the actuator motor 92 may have a rating of one-half horsepower or less. In prior art structures, the actuating motor would most likely have to have a rating of at least 10 horsepower in a similar installation. This feature of the present invention is of particular importance when the aligning apparatus is to be utilized with a conveyor belt disposed in a deep mine due to the difficulty of getting equipment into the mine and due to the necessity for shielding all electrical apparatus to prevent explosions.

From the foregoing, it will be appreciated that the present invention provides an improved aligning apparatus for conveyor belts and the like wherein the belt drive pulley and the drive means therefor are mounted on a frame, which frame is pivotally mounted for swinging movement upon actuation of a small power unit to effect and maintain proper alignment of the conveyor belt with respect to its supporting frame and supporting rollers and pulleys. Also, the belt aligner provided by the present invention is of extremely economical and practical construction and is adapted for rugged service for prolonged periods of time.

While I have described what I regard to be a preferred embodiment of my invention, it will be appreciated that various changes, rearrangements and modifications may be made therein without departing from the scope of the invention, as defined by the appended claims.

I claim:

1. Aligning apparatus for conveyor belts and the like, comprising a generally planar frame, a belt supporting pulley journaled on said frame for rotation about an axis substantially parallel to the plane of said frame, means forwardly of said pulley pivotally supporting said frame and defining a pivot axis for said frame substantially normal to the plane of said frame and disposed forwardly of said pulley, means rearwardly of said pulley slidably supporting said frame, and an actuator disposed rearwardly and outwardly of said pulley and operatively associated with said frame rearwardly of said pulley for moving said frame about said pivot axis thereof, whereby said pulley may be moved in an arc about said pivot axis from a normal position wherein its axis is disposed substantially at a right angle to the longitudinal axis of the conveyor belt to a position inclined with respect to the axis of the conveyor belt to move the belt laterally in either direction to align the belt in predetermined relation to the normal position of said pulley.

2. Aligning apparatus for conveyor belts and the like, comprising a frame, a drive pulley journaled on said frame, means pivotally supporting said frame to one side of said pulley, said means affording a pivot axis for said frame disposed to said one side of and substantially at a right angle to the axis of said pulley, means slidably supporting said frame to the opposite side of said pulley, a power unit supported on said frame for driving said drive pulley, and means for swinging said frame about said pivot axis thereof.

3. Aligning apparatus for conveyor belts and the like, comprising a frame, a drive pulley journaled on said frame, a snub pulley journaled on said frame in spaced parallel relation to said drive pulley, means pivotally supporting said frame to one side of said pulleys, said means affording a pivot axis for said frame disposed to said one side of and substantially at a right angle to the axes of said pulleys, means slidably supporting said frame to the opposite side of said pulleys, a drive unit supported on said frame for driving said drive pulley, an actuator operatively associated with said frame adjacent the said opposite side of said pulleys for moving said frame about said pivot axis thereof, and means responsive to the disposition of the conveyor belt for energizing said actuator.

4. Aligning apparatus for conveyor belts and the like, comprising a frame, an end pulley journaled on said frame, means pivotally supporting the forward end of said frame and defining a pivot axis perpendicular to and disposed forwardly of the axis of said pulley, means slidably supporting the rearward end of said frame, and a power unit supported by said means for slidably supporting the rearward end of said frame, said power unit being supported independently of said frame and being operatively associated with said frame for swinging said frame about the pivotal support thereof.

5. Aligning apparatus for conveyor belts and the like, comprising a frame, a drive pulley journaled on said frame, means pivotally supporting the forward end of said frame and affording a pivot axis for said frame perpendicular to and spaced forwardly of the axis of said pulley, a power unit supported on said frame for driving said pulley, and a second power unit supported independently of said frame and operatively associated with said frame for moving said frame about the pivotal axis thereof.

6. Aligning apparatus for conveyor belts and the like, comprising a frame, a drive pulley journaled on said frame, means pivotally supporting the forward end of said frame and defining a pivot axis disposed in spaced perpendicular relationship with respect to the axis of said pulley, means slidably supporting the rearward end of said frame, a power unit supported on said frame for driving said pulley, a second power unit supported on said means for slidably supporting the rearward end of said frame, said second power unit being supported independently of said frame and being operatively associated with the rearward end of said frame for moving said frame about the pivotal support thereof, and control instrumentalities disposed adjacent the edge of the conveyor belt and responsive to the disposition of the conveyor belt to effect energization of said second power unit.

7. Aligning apparatus for conveyor belts and the like, comprising a frame, an end pulley journaled on said frame intermediate the ends of said frame, a first leg pivotally supporting said frame at the forward end thereof, said first leg defining a pivot axis for said frame disposed forwardly of and substantially at a right angle to the axis of said pulley, a pair of legs slidably supporting said frame at the rearward end thereof, and a power unit supported by one of said pair of legs independently of said frame and operatively associated with said frame for moving said frame about the pivotal axis defined by said first leg.

8. Aligning apparatus for conveyor belts and the like comprising a frame, a drive pulley journaled on said frame intermediate the ends of said frame, a snub pulley journaled on said frame forwardly of said drive pulley in spaced parallel relation to said drive pulley and intermediate the ends of said frame, a first leg pivotally supporting said frame at the forward end thereof, said first leg defining a pivot axis disposed in alignment with the longitudinal axis of the conveyor belt, said frame including a lateral extension aligned generally with the axis of said drive pulley, a power unit supported on said lateral extension of said frame for driving said drive pulley, a pair of legs slidably supporting said frame at the rearward end thereof, one of said pair of legs supporting said frame beneath said power unit, the other of said pair of legs being positioned adjacent the opposite side of said frame, and a second power unit supported by said other of said pair of legs independently of said frame, said second power unit being operatively associated with said frame for moving said frame about the pivot axis defined by said first leg.

9. Aligning apparatus for conveyor belts and the like comprising a frame, an end pulley journaled on said frame, a first leg pivotally supporting said frame at the forward end thereof, said first leg defining a pivot axis for said frame disposed forwardly of and substantially at a right angle to the axis of said pulley, a pair of legs slidably supporting said frame at the rearward end thereof, said first leg being hollow, a bearing including a shaft journaled in said leg, a stud connected to said frame at the forward side thereof and slidably supported by said bearing, resilient means normally biasing said stud and said frame rearwardly of said first leg, and a power unit supported by one of said pair of legs independently of said frame, said power unit being operatively associated with said frame for moving said frame about the pivot axis defined by said shaft and said first leg, said resilient means being adapted to yield to accommodate swinging movement of said frame and said pulley against the load of the conveyor belt.

10. Aligning apparatus for conveyor belts and the like, comprising a frame, an end drive pulley journaled on said frame, said frame being adapted to be disposed in alignment with a conveyor belt with the belt reeved over said pulley, a first leg pivotally supporting the forward end of said frame and defining a pivot axis perpendicular to said frame and the axis of said pulley forwardly of said pulley, said frame including a lateral extension aligned generally with said pulley, a drive unit mounted on said frame extension and operatively associated with said pulley, a second leg positioned beneath said frame extension at the rearward end thereof and providing a slidable support for said frame, a third leg positioned beneath said frame at the side thereof opposite said extension and at the rearward end thereof, said third leg providing a slidable support for said frame, and an actuator mounted on said third leg to the side of said frame, said actuator being operatively associated with said frame for moving the same in an arc about the pivot axis thereof.

11. Aligning apparatus as set forth in claim 10, including resilient means associated with said frame and said first leg normally biasing said frame rearwardly of said first leg, said resilient means accommodating movement of said frame forwardly with respect to said first leg.

References Cited in the file of this patent

UNITED STATES PATENTS

| 2,243,538 | Salfisberg | May 27, 1941 |
| 2,304,843 | Nordquist | Dec. 15, 1942 |